United States Patent
Scheglmann et al.

(10) Patent No.: US 7,474,511 B2
(45) Date of Patent: Jan. 6, 2009

(54) VOICE-COIL MOTOR AND POSITIONING DEVICE OR SERVO-TRACK WRITER INCLUDING A VOICE-COIL MOTOR

(75) Inventors: Gerhard Scheglmann, Ruhpolding (DE); Volker Hoefer, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 364 days.

(21) Appl. No.: 11/166,449

(22) Filed: Jun. 24, 2005

(65) Prior Publication Data

US 2005/0286172 A1    Dec. 29, 2005

(30) Foreign Application Priority Data

Jun. 24, 2004    (DE) .................. 10 2004 030 500

(51) Int. Cl.
G11B 21/02    (2006.01)
G11B 5/55    (2006.01)
(52) U.S. Cl. ..................... 360/265; 360/264.7
(58) Field of Classification Search ... 360/264.7–264.9, 360/265; 310/15, 68 B
See application file for complete search history.

(56) References Cited

U.S. PATENT DOCUMENTS

| | | | | |
|---|---|---|---|---|
| 4,314,295 A | * | 2/1982 | Frandsen | 360/266.9 |
| 4,408,311 A | * | 10/1983 | Suzuki et al. | 369/43 |
| 4,620,252 A | * | 10/1986 | Bauck et al. | 360/265 |
| 4,775,908 A | * | 10/1988 | Ycas | 360/264.9 |
| 4,795,925 A | * | 1/1989 | Mihara et al. | 310/68 B |
| 5,557,152 A | * | 9/1996 | Gauthier | 310/46 |
| 5,761,000 A | | 6/1998 | Ahn | |
| 6,885,457 B1 | | 4/2005 | Michel et al. | |

FOREIGN PATENT DOCUMENTS

| | | | |
|---|---|---|---|
| DE | 196 37 953 | | 6/1997 |
| EP | 0 978 708 | | 2/2000 |
| JP | 62072015 A | * | 4/1987 |
| JP | 11133481 A | * | 5/1999 |

* cited by examiner

Primary Examiner—William J Klimowicz
(74) Attorney, Agent, or Firm—Kenyon & Kenyon LLP

(57) ABSTRACT

A voice-coil motor includes a stator and a rotor, which is pivoted about a swivel axis, with respect to the stator. The rotor and/or the stator has a printed circuit board that includes at least one circuit-board conductor, and the at least one circuit-board conductor is arranged such that it forms at least one coil unit in a plane, the at least one coil unit including several circuit traces. Within one coil unit, more than two circuit traces have a section, in which the specific circuit trace is oriented in the direction of the swivel axis.

24 Claims, 3 Drawing Sheets

VOICE-COIL MOTOR AND POSITIONING DEVICE OR SERVO-TRACK WRITER INCLUDING A VOICE-COIL MOTOR

CROSS-REFERENCE TO RELATED APPLICATIONS

The present application claims priority to Application No. 10 2004 030 500.5, filed in the Federal Republic of Germany on Jun. 24, 2004, which is expressly incorporated herein in its entirety by reference thereto.

FIELD OF THE INVENTION

The present invention relates to a voice-coil motor and to a positioning device that may be particularly suited for precisely moving a swivel arm for a servo-track writer.

BACKGROUND INFORMATION

As mentioned above, positioning devices of this type are often used in servo track writers (STW), where the tracks for magnetizable hard disks are set up or written. In this context, a shaft, on which a swivel arm is mounted, is pivoted in the STW by a voice-coil motor or pivot drive in the positioning device. At its end, a write head is provided which is ultimately moved by the swivel motion of the shaft and is positioned in a highly precise manner, so that as many tracks as possible per unit surface area of the hard disk can be configured. The number of tracks set up per unit surface area or unit diameter (tracks per inch) is a measure of the storage capacity of hard disks. For this reason, efforts are undertaken to achieve a track allocation that is as tight as possible. For a hard disk manufacturer to be able to configure hard disks with a dense track allocation in an economical manner, it must be possible to position the swivel arm of the STW in an exact manner within a very short time (seek and settle time).

A voice-coil motor, whose stator is designed as a printed circuit board, is described in German Published Patent Application No. 196 37 953. This printed circuit board has a circuit-board conductor, which is designed to form a winding or coil unit. This coil unit is made up of a circuit-board conductor having several circuit traces, which are side-by-side and extend in parallel.

Conventional voice-coil motors and the corresponding positioning devices may have the disadvantage that their accuracy and their seek-and-settle time do not satisfy the highest standards.

SUMMARY

Example embodiments of the present invention may provide a voice-coil motor, which may have excellent operating characteristics, and a positioning device, which may allow extremely exact positioning and very short seek-and-settle times, while maintaining comparatively low manufacturing expenditure and simple operation.

The alignment of circuit traces in particular sections on a printed circuit board may be important for effective functioning, e.g., for reducing the seek-and-settle time of the positioning device.

The positioning device according to an example embodiment of the present invention may allow for technically simple and cost-effective construction and extremely precise and rapid positioning. In addition, an example embodiment of the present invention may provide a swiveling motion, which is distinguished by a uniform and constant angular velocity. This may constitute an advantageous operating characteristic, e.g., in STW's.

Inaccuracies in the positioning of a rotor or swivel arm on a swiveling shaft may be caused, to a significant extent, by vibrations that are introduced by the voice-coil motor. In this context, motor forces having a directional component that is radial in relation to the swivel axis may be particularly disruptive.

The vibration response may be changed in an unexpectedly positive manner by improving the alignment of the sections of circuit traces, which act to introduce the forces necessary for rotating the swivel arm. Within a coil unit, more than two circuit traces accordingly have at least one section, in which the specific circuit trace is oriented in the direction of the swivel axis. Therefore, in contrast to conventional circuit-trace guideways on printed circuit boards, circuit traces in the active sections do not have a parallel path, but are oriented in the direction of the swivel axis. In this connection, the alignment or the path of the circuit traces in the active sections is arranged so that, in total, practically no radially directed forces may be generated by the voice-coil motor.

In the following, the term coil unit is to be understood as a region of a circuit-board conductor, which constitutes, according to function, an electromagnetic coil. In this context, the coil unit may include several circuit traces. Circuit traces are circuit-board conductor regions situated side-by-side within a coil unit. For example, a coil unit may include a circuit-board conductor, which is, in principle, spiral-shaped. The circuit-board conductor is arranged such that several circuit traces are arranged side-by-side.

The voice-coil motor of an example embodiment of the present invention may be provided with an appropriately arranged, printed circuit board, either on the stator or on the rotor, or on both the stator and the rotor. Frequently, only the stator or the rotor is equipped with the printed circuit board, which means that the respective counterpart is fitted with permanent magnets.

The corresponding, printed circuit board may be arranged as a one-layer, printed circuit board, where corresponding circuit traces are deposited on one or on both sides. However, to increase the attainable torque, the printed circuit board may also be produced as a multilayer printed circuit board, in which case a plurality of superposed circuit traces may be arranged within the multilayer assembly.

In the voice-coil motor, more than 25%, e.g., more than 50%, and, e.g., more than 75% of all circuit traces, each may have at least one segment, in which the circuit trace in question is aligned in the direction of the swivel axis.

The positioning device may be combined with a high-accuracy position measuring device, which operates using photoelectric scanning, e.g., according to an interferential measuring principle. This combination may allow synergistic effects to be achieved, with the aid of which it may be possible to produce an extremely accurate and rapid positioning device.

According to an example embodiment of the present invention, a voice-coil motor includes a stator and a rotor pivotable about a swivel axis relative to the stator. At least one of (a) the stator and (b) the rotor includes a printed circuit board having at least one circuit-board conductor arranged to form at least one coil unit in a plane, and the at least one coil unit includes a plurality of circuit traces. Within one coil unit, more than two circuit traces include a section oriented in a direction toward the swivel axis.

The printed circuit board may be attached to the rotor.

More than 50% of all of the circuit traces may include a section oriented in a direction toward the swivel axis.

More than 75% of all of the circuit traces may include a section oriented in a direction toward the swivel axis.

Circuit traces within a coil unit may include a section extending along a partially circular line having a center located on the swivel axis.

At least one circuit-board conductor may be arranged to form a plurality of coil units in one plane.

The coil units may be arranged substantially symmetrically with respect to a point arranged in the plane of the coil units on the swivel axis.

The coil units may include a spiral-shaped path. A partial number of the coil units may be oriented in a clockwise direction, and a partial number of the coil units may be oriented in a counterclockwise direction.

The printed circuit board may include a plurality of layers, and each layer may include at least one coil unit.

Sections of the circuit traces of the coil units may be arranged on different layers of the printed circuit board in a superposed manner.

The sections of the circuit traces oriented toward the swivel axis may be arranged on different layers of the printed circuit board in a superposed manner.

According to an example embodiment of the present invention, a positioning device includes: a swivel shaft, one end of the swivel shaft attachable to an element to be positioned; a position measuring device including two parts movable relative to each other; and a voice coil motor including a stator and a rotor, the rotor pivotable about a swivel axis relative to the stator. At least one of (a) the rotor and (b) the stator includes a printed circuit board having at least one circuit-board conductor arranged to form at least one coil unit in a plane, and the at least one coil unit includes a plurality of circuit traces. Within one coil unit, more than two circuit traces include a section oriented toward the swivel axis.

The positioning device may be arranged as a servo-track writer.

The printed circuit board may be attached to the rotor.

The position measuring device may be configured to perform photoelectric scanning, e.g., according to an interferential measuring principle.

A first part of the position measuring device may include a transparent phase grating, and a second part of the position measuring device may include a reflection phase grating.

A first part of the position measuring device may include a reflection phase grating, and a second part of the position measuring device may include a transparent phase grating.

According to an example embodiment of the present invention, a servo track writer includes: a swivelable shaft, one end of the shaft attachable to an element to be positioned; a position measuring device including two parts movable relative to each other; and a voice-coil motor including a stator and a rotor, the rotor pivotable about a swivel axis relative to the stator. At least one of (a) the rotor and (b) the stator includes a printed-circuit board having at least one circuit-board conductor arranged to form at least one coil unit in a plane, and the at least one coil unit includes a plurality of circuit traces. Within one coil unit, more than two circuit traces include a section oriented toward the swivel axis.

The printed circuit board may be attached to the rotor.

The position measuring device may be configured to perform photoelectric scanning, e.g., according to an interferential measuring principle.

A first part of the position measuring device may include a transparent phase grating, and a second part of the position measuring device may include a reflection phase grating.

A first part of the position measuring device may include a reflection phase grating, and a second part of the position measuring device may include a transparent phase grating.

Further features and aspects hereof are described below in the following description of an exemplary embodiment with reference to the appended Figures.

DETAILED DESCRIPTION

Figure 1:
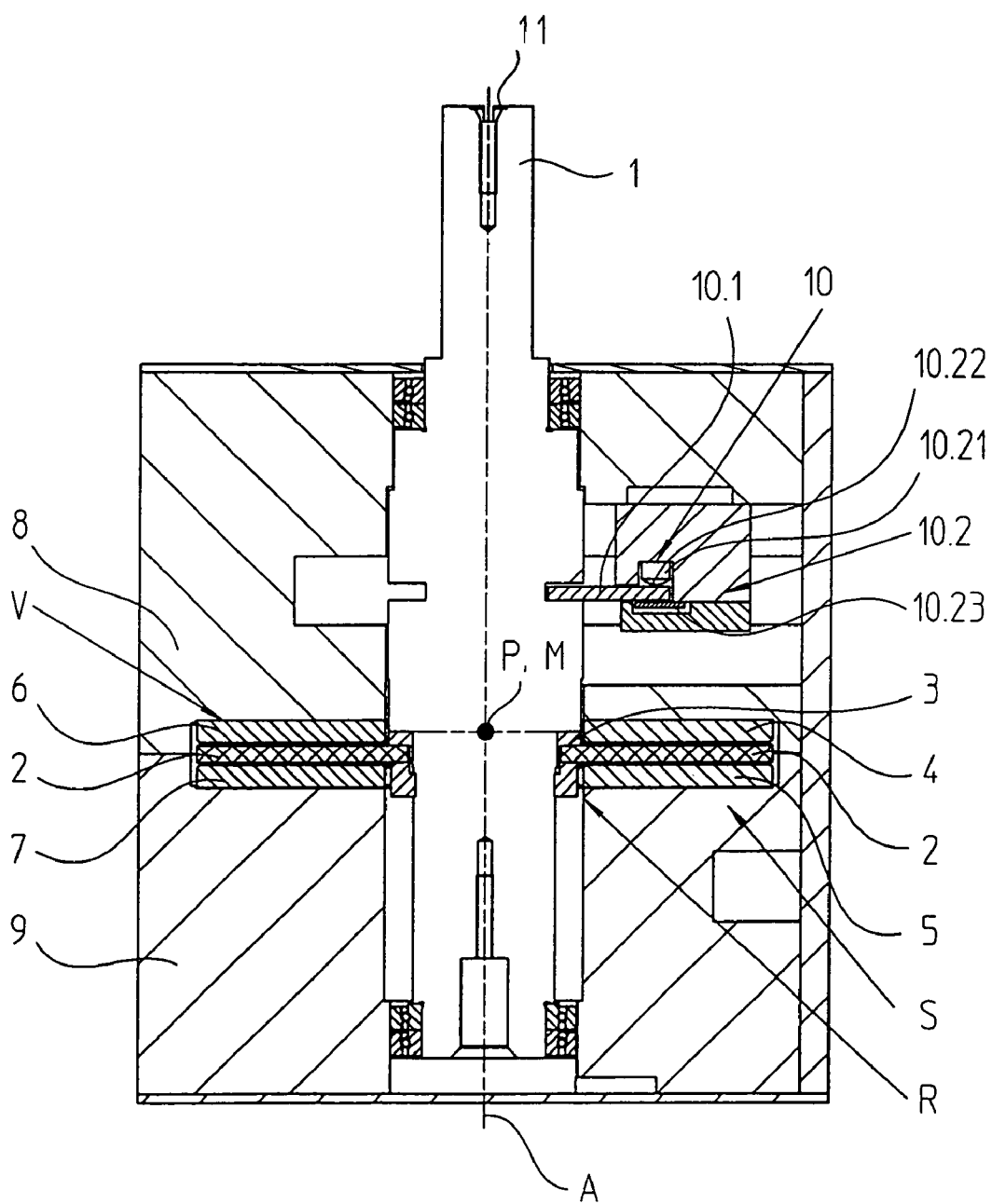
FIG. 1 is a cross-sectional view of the positioning device according to an example embodiment of the present invention.

FIG. 1 illustrates a positioning device as it is used in connection with STW's. According to FIG. 1, a shaft 1 is able to swivel about a swivel axis A and has a shaft end 1.1, to which a swivel arm for writing to a hard disk may be attached.

The swiveling motion, the exemplary embodiment illustrated allowing for a swivel range of up to ±90°, is initiated by a so-called voice-coil motor V, an electrical direct drive. The primary part of voice-coil motor V is arranged as a multilayer printed circuit board 2, which functions, in the example illustrated, as a rotor R within the swivel region. In addition to multilayer printed circuit board 2, rotor R includes a fixing ring 3, which is connected to shaft 1 in a rotatably fixed manner for transmitting a torque.

The secondary part includes permanent magnets 4, 5, 6, 7, which are attached, along a circle, to magnet supports 8, 9 made of ferromagnetic material. In the operation of the positioning device, the secondary part acts as a torque support and does not take part in the swivel motion of shaft 1, and therefore constitutes a stator S in the exemplary embodiment illustrated. Therefore, voice-coil motor V operates according to the principle of a synchronous direct drive. The positioning of permanent magnets 4, 5, 6, 7 on both sides allows a homogeneous magnetic field to be generated, which may be of particular importance for good operating characteristics of voice-coil motor V.

The swivel angle of shaft 1 is measured by a position measuring device 10, which works according to a similar operating principle, as is described in European Published Patent Application No. 0 978 708. According to this, position measuring device 10 includes a transparent phase grating 10.1, which has the shape of a segment of a ring disk so that the entire swivel range may be scanned. In this context, transparent phase grating 10.1 is connected to shaft 1 in a rotatably fixed manner, which means that it takes part in the swivel movements of shaft 1.

Non-rotating scanning device 10.2 of position measuring device 10 is arranged opposite to the phase grating. Scanning device 10.2 includes a light source 10.21 which, for example, takes the form of a LED, a condenser lens 10.22 and a scale segment 10.23, as well as photodetectors for receiving the modulated light beams. Scale segment 10.23 takes the form of a reflection phase grating or a step grating. That is to say that reflecting marks, which have a height of 0.2 μm in the example illustrated, are applied to a reflecting surface. Since scale segment 10.23 does not take part in the swivel movement and is therefore always opposite to light source 10.21, it may be arranged to be small in comparison with swiveling phase grating 10.1.

In the operation of the positioning device, the light generated by light source 10.21 arranged as a LED first passes through condenser lens 10.22 and subsequently through transparent phase grating 10.1, which generates diffracted beam portions and causes a phase change of the light waves. The light beams thus modified then reach scale segment 10.23 in the form of the reflection phase grating. There, they are again diffracted, and a further phase change of the light waves occurs. The reflected and diffracted light beams then pass through transparent phase grating 10.1 again and are again diffracted and interfere with each other. The ray bundles modulated in this manner then strike photodetectors, which are located in the region of light source 10.21 and are not visible in the sectional view of FIG. 1. The photodetectors convert the light signals into electrical signals, which are then suitably processed further to obtain the location information. The use of comparatively small scale segment 10.23 as a non-rotating part may provide that the tolerances with respect to the wobble of scale segment 10.23 do not have to be chosen to be as tight as would be the case if scale segment 10.23 would rotate in operation.

In an example embodiment of position measuring device 10, scanning unit 10.2 includes a so-called VCSEL (Vertical Cavity Surface Emitting Laser) as a light source 10.21. A ray bundle, which spreads out along the direction of an optical axis, is emitted by this light source 10.21. The emitted ray bundle may be a TEM 00 mode of a Gaussian beam, which is emitted by the utilized VCSEL. Because of the VCSEL radiation characteristic, the emitted ray bundle has a certain divergence and is transformed by condenser lens 10.22. The beam transformation of the emitted, divergent ray bundle may take place such that, after condenser lens 10.22, an approximately collimated ray bundle is formed, which has a beam throat at a certain distance from condenser lens 10.22. In this context, beam throat is to be understood as the location in the beam cross-section along the direction of beam propagation, at which location the ray bundle has its minimum surface area or lateral expansion. Positioned in the region of the beam throat is phase grating 10.1, upon which the transformed ray bundle impinges. The positioning of phase grating 10.1 at this location may provide that the build-on tolerance is thereby increased in both the radial or tangential direction and in the direction of beam propagation, i.e., in the axial direction. For a high build-on tolerance in this direction, one may strive for illuminating phase grating 10.1 with the aid of a ray bundle of low divergence and a small beam diameter. Since these quantities may not be arbitrarily minimized in the case of a predefined wavelength, a compromise may be found for the optimum positioning of phase grating 10.1. Such a compromise is obtained by positioning phase grating 10.1 in the beam throat of the emitted or transformed ray bundle, where the product of the divergence and beam diameter of the TEM 00 mode of a Gaussian beam is at a minimum. Phase grating 10.1 splits the incident ray bundle into first and second partial ray bundles, which spread out away from the optical axis. As already described in connection with the first alternative of position measuring device 10, the ray bundles changed in this manner also strike the photodetectors, which are arranged in the region of light source 10.21. The photodetectors convert the light signals into position-dependent, electrical signals.

During the use of such a high-resolution, interferential position measuring device 10, an optimization of the operational performance of voice-coil motor V may be provided for achieving a greatest possible increase in precision and speed of the positioning device as a whole. For this reason, the arrangement of voice-coil motor V is structurally modified.

Figure 2:
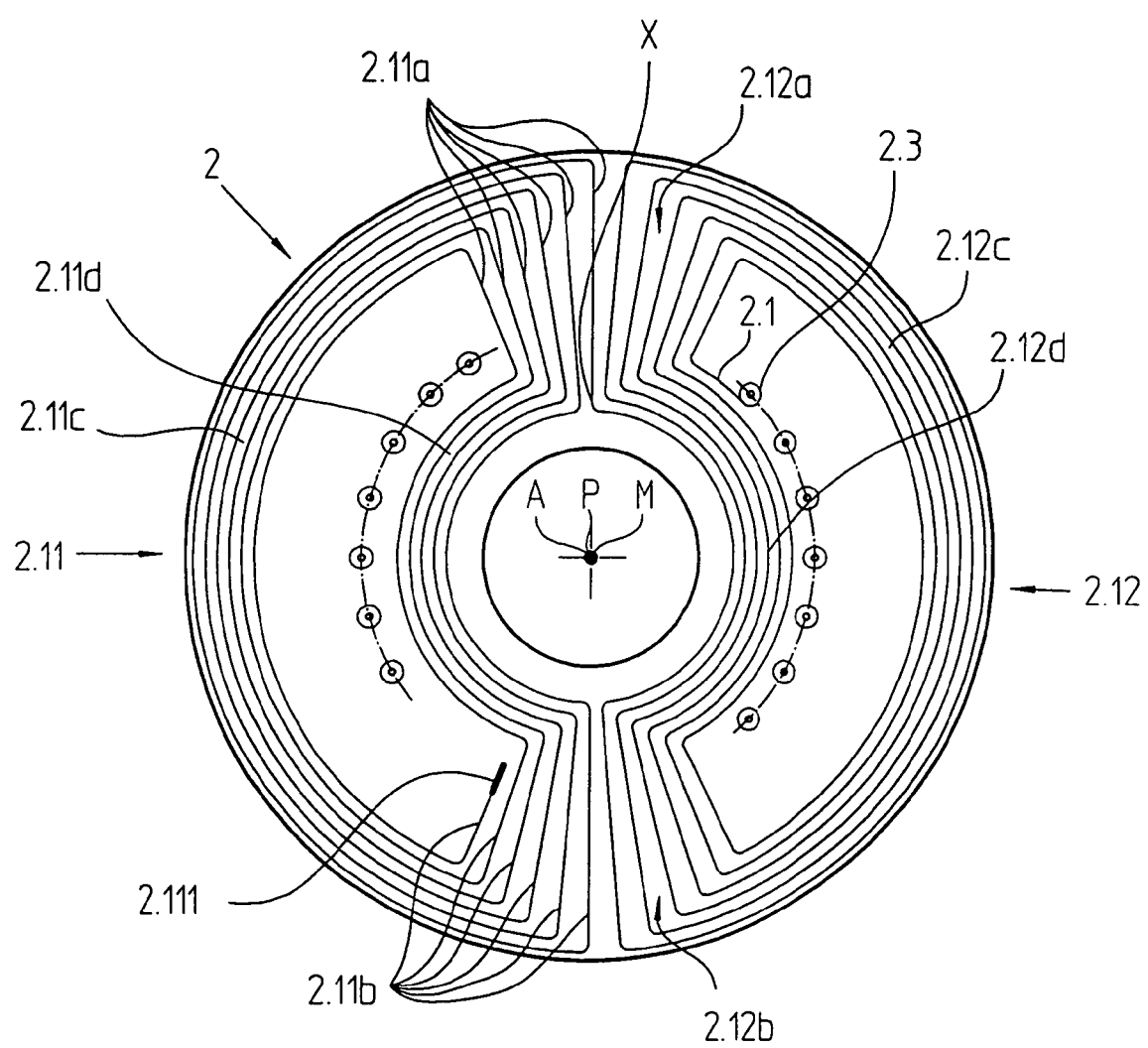
FIG. 2 is a plan view of a multilayer printed circuit board, as it is used as a primary part on the rotor of the voice-coil motor.

Illustrated in FIG. 2 is a plan view, not to scale, of multilayer printed circuit board 2, which is made up of a total of 14 superposed layers. A circuit board conductor 2.1 is deposited on the upper surface of each layer. In the exemplary embodiment illustrated, circuit trace 2.1 has a width of 1.25 mm and a thickness of 70 μm. On multilayer printed circuit board 2, a minimum distance between the individual traces of circuit-board conductor 2.1 does not fall below 250 μm. Since FIG. 2 is a plan view of multilayer printed circuit board 2, only the uppermost or first layer of multilayer printed circuit board 2 may be seen.

The path of circuit-board conductor 2.1 of the top layer of multilayer printed circuit board 2 is arranged so that two coil units 2.11, 2.12 are formed. These two coil units 2.11, 2.12 are arranged in one plane, e.g., in the plane of the uppermost layer of multilayer printed circuit board 2, and constitute, according to function, two electromagnetic coils.

First coil unit 2.11 begins at a soldered terminal pad 2.111 for a supply line. In the region of first coil unit 2.11, circuit-board conductor 2.1 has a spiral-like path, circuit-board conductor 2.1 illustrated in FIG. 2 being oriented clockwise. In FIG. 2, first coil unit 2.11 therefore is arranged on the left half of the uppermost layer of multilayer printed circuit board 2. The result of the spiral-like pattern of circuit-board conductor 2.1 is that, when current flows through circuit-board conductor 2.1, a magnetic field is formed in the region of first coil unit 2.11, the magnetic field corresponding to that of a wire coil wound in the clockwise direction. In the case of conventional wire coils, often only one wire is used, which, after the winding, is then present in the form of several adjacent layers. The wire in conventional coils therefore corresponds to circuit-board conductor 2.1. Consequently, one layer of the wire in conventional coils (or one turn) corresponds here to one circuit trace in the exemplary embodiment. In a manner analogous to wire layers in conventional coils, several circuit traces of circuit-board conductor 2.1 are arranged side-by-side and on the first layer of multilayer printed circuit board 2.

When one, starting from soldered terminal pad 2.111, follows the path of circuit-board conductor 2.1, then, after first coil unit 2.11, which is oriented in a clockwise direction, one arrives at a point of inflection X. As of point of inflection X, circuit-board conductor 2.1 then enters the region of second coil unit 2.12. In FIG. 2, second coil unit 2.12 is now oriented in a counterclockwise direction, and, in the region of second coil unit 2.12, circuit-board conductor 2.1 is arranged to form several adjacent circuit traces. At the end of circuit-board conductor 2.1, a plated-through hole point 2.3, through which an electrical contact to the next layer of multilayer printed circuit board 2 is established, is arranged on the first layer of multilayer printed circuit board 2.

In so-called parallel segments 2.11c, 2.11d, 2.12c, 2.12d of the two coil units 2.11, 2.12, the circuit traces of circuit-board conductor 2.1 are arranged in parallel on circular segments, which each have different radii but a common center M, center M being arranged on swivel axis A in the plane of the top layer of multilayer printed circuit board 2. In parallel sections 2.11c, 2.11d, 2.12c, 2.12d of coil units 2.11, 2.12, the spacing of adjacent circuit traces of circuit-board conductor 2.1 is equal to the permissible minimum spacing. In this manner, it may be ensured that sections 2.11a, 2.11b, 2.12a, 2.12b, within which the circuit traces are radially oriented, have a large effective length.

In conventional arrangements, one may attempt to orient the circuit traces as parallel as possible on the entire printed circuit board surface, in order to provide a maximum magnetic field. However, in the exemplary embodiment illustrated, all of the circuit traces on multilayer printed circuit board 2 have, within each coil unit 2.11, 2.12, segments 2.11a, 2.11b, 2.12a, 2.12b, within which the circuit traces are oriented radially, i.e., in the direction of swivel access A. But, as may be gathered from FIG. 2, the circuit traces also have segments 2.11a, 2.11b, 2.12a, 2.12b, which do not extend in parallel. When lines are drawn through the circuit traces in sections 2.11a, 2.11b, 2.12a, 2.12b, these lines intersect at a point P on swivel axis A in the plane of the uppermost layer of multilayer printed circuit board 2 (in the exemplary embodiment illustrated, point P coincides with above-mentioned center M). In other words, the circuit traces in sections 2.11a, 2.11b, 2.12a, 2.12b, which act to generate the torque, are oriented towards swivel axis A of the swivel drive, i.e., in a strictly radial direction.

Due to the radial orientation, sections 2.11a, 2.11b, 2.12a, 2.12b necessarily have regions, in which the minimum distance between two adjacent circuit traces is exceeded. Yet, the voice-coil motor, which has circuit-board conductor 2.1, may provide outstanding operating characteristics, for the radial alignment of the circuit traces in sections 2.11a, 2.11b, 2.12a, 2.12b allow rotational forces to be generated, which substantially have no radial direction component.

In the exemplary embodiment illustrated, all of the circuit traces in sections 2.11a, 2.11b, 2.12a, 2.12b, which are therefore active with respect to generating the torque, are oriented in a strictly radial manner, as mentioned above. In contrast to this, the paths of the remaining circuit traces of circuit-board conductor 2.1 in parallel sections 2.11c, 2.11d, 2.12c, 2.12d have no radial direction component, since the distance of each circuit trace to swivel axis A is always constant in parallel sections 2.11c, 2.11d, 2.12c, 2.12d. Therefore, coil units 2.11, 2.12 include adjacent circuit traces, which are arranged in parallel sections 2.11c, 2.11d, 2.12c, 2.12d such that their path there has no radial direction component, and that, on the other hand, in sections 2.11a, 2.11b, 2.12a, 2.12b, which may also be referred to as active sections 2.11a, 2.11b, 2.12a, 2.12b, the circuit traces are oriented radially in the direction of swivel axis A.

Apart from comparatively small partial surfaces in the region of soldered terminal pad 2.111 and in the region of plated-through hole point 2.3, coil units 2.11, 2.12 are symmetric with respect to point P on swivel axis A, the point being arranged in the plane of coil units 2.11, 2.12. Therefore, coil units 2.11, 2.12 are positioned substantially symmetrically with respect to point P, except in the above-described, relatively small, partial surfaces. In the described exemplary embodiment, the circuit traces in sections 2.11a, 2.11b, 2.12a, 2.12b are positioned centrosymmetrically with respect to point P.

This type of path of circuit-board conductor 2.1 may allow outstandingly smooth running of voice-coil motor V, and that vibrations of the swivel arm may be prevented to a great extent. The result of this is that the performance of an STW may be substantially increased. In particular, an STW, in conjunction with voice-coil motor V, may allow the seek and settle time to be significantly reduced.

To increase the torque of voice-coil motor V, multilayer printed circuit board 2 has a total of 14 superposed layers. The top four layers are illustrated in FIGS. 3a through 3d.

As is the case with the remaining layers of multilayer printed circuit board 2, the four top layers illustrated in FIGS. 3a through 3d each have two coil units 2.11 through 2.18, as well, whereby within one layer, the spiral-like paths of adjacent coil units are oriented in opposite directions (one is oriented in the clockwise direction and one is oriented in the counterclockwise direction).

In the exemplary embodiment illustrated, plated-through hole points 2.3 through 2.6 are staggered along a partial circle. This positioning of plated-through hole points 2.3 through 2.6 of the individual layers of multilayer printed circuit board 2 may provide that, in each instance, the top layer may be provided with a through-hole in the region of the through-hole plating, without cutting through circuit traces. Sections 2.11a, 2.11b, 2.12a, 2.12b; 2.11c, 2.11d, 2.12c, 2.12d; 2.13a, 2.13b, 2.14a, 2.14b; 2.15c, 2.15d, 2.16c, 2.16d; 2.17c, 2.17d, 2.18c, 2.18d of the circuit traces of coil units 2.11 through 2.18 are therefore positioned on different layers of multilayer printed circuit board 2 in a superposed manner.

Figure 3A:
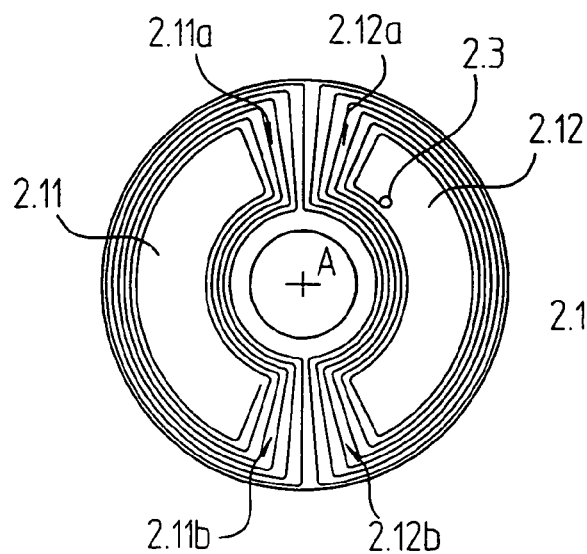
FIG. 3a is a plan view of the first separated layer of the multilayer printed circuit board.

As illustrated in FIG. 3a, the first layer of multilayer printed circuit board 2 is formed such that inside the two coil units 2.11, 2.12, six circuit traces each have two sections 2.11a, 2.11b, in which the specific circuit traces are aligned in the direction of swivel axis A.

Figure 3B:
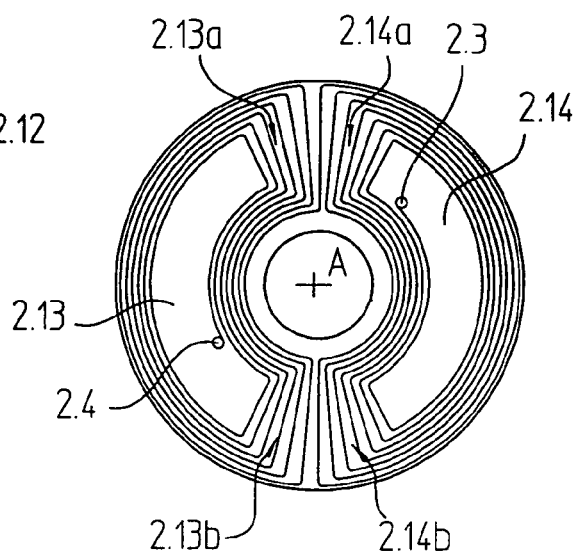
FIG. 3b is a plan view of the second separated layer of the multilayer printed circuit board.
Figure 3C:
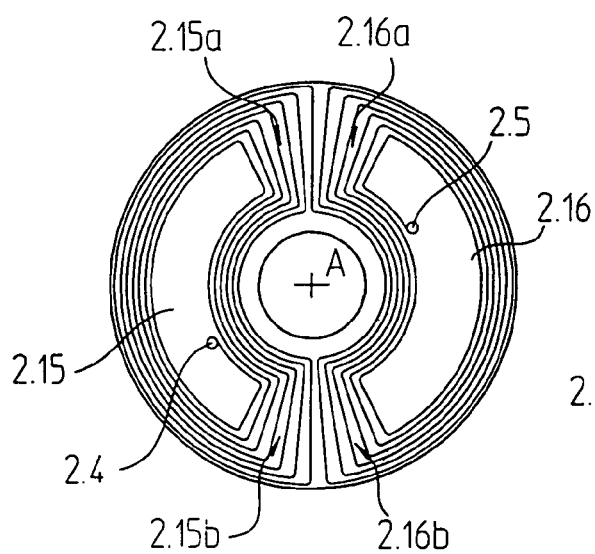
FIG. 3c is a plan view of the third separated layer of the multilayer printed circuit board.
Figure 3D:
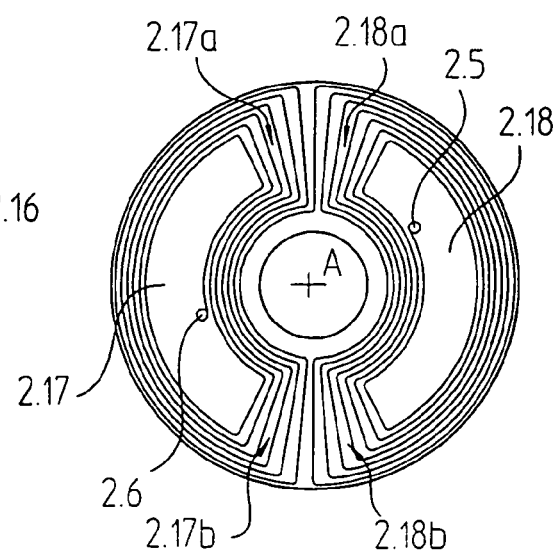
FIG. 3d is a plan view of the fourth separated layer of the multilayer printed circuit board.

However, as illustrated in FIGS. 3b and 3d, the second and fourth layers of multilayer printed circuit board 2 are arranged such that only inside coil units 2.13, 2.17 do six circuit traces have sections 2.13a, 2.13b, 2.17a, 2.17b, within which the circuit traces are oriented in the direction of swivel axis A. Coil units 2.14, 2.18 have seven circuit traces, including sections 2.14a, 2.14b, 2.18a, 2.18b, in which the circuit traces are oriented in the direction of swivel axis A.

The third layer of multilayer printed circuit board 2 is illustrated in FIG. 3c. Arranged in left coil unit 2.15 of this third layer are seven sections 2.15a, 2.15b of the circuit trace, in which the circuit traces are oriented in the direction of swivel axis A, while in right coil unit 2.16, two sections 2.16a, 2.16b are illustrated within which six circuit traces extend radially.

In order that this unequal distribution in layers two through thirteen may not cause any unevenness in the operational performance of voice-coil motor V, the second and third (as well as the fifth and sixth, etc.) layers are arranged so as to be mirror images of each other, which means that the seven circuit traces of coil unit 2.15 in sections 2.15a, 2.15b are arranged above the six circuit traces of coil unit 2.13 in sections 2.13a, 2.13b. Since multilayer printed circuit board 2 has twelve inner layers, the above-described, uneven distribution over the individual inner layers is compensated for, in that multilayer printed circuit board 2 allows a uniform magnetic field to be generated. The outer layers, i.e., the first and fourteenth layers, are arranged to be uniform, always having six circuit traces, which are oriented in the direction of swivel axis A.

As an alternative to the foregoing, the rotor may have one or more permanent magnets. In this arrangement, the stator would include two printed circuit boards, between which the permanent magnet(s) is (are) pivoted. In the case of this type of construction, the circuit traces on the corresponding printed circuit boards also have more than two sections, within which the circuit traces are oriented in the direction of swivel axis A.

What is claimed is:

1. A voice-coil motor, comprising:
a stator; and
a rotor pivotable about a swivel axis relative to the stator;

wherein at least one of (a) the stator and (b) the rotor includes a printed circuit board having at least one circuit-board conductor arranged to form at least one coil unit in a plane, the at least one coil unit including a plurality of circuit traces; and wherein within one coil unit, more than two circuit traces include a radial section oriented in a radial direction directly toward the swivel axis, an extension of each radial section intersecting the swivel axis wherein each radial section in nonparallel to each adjacent radial section.

2. The voice-coil motor according to claim 1, wherein the printed circuit board is attached to the rotor.

3. The voice-coil motor according to claim 1, wherein more than 50% of all of the circuit traces include a radial section.

4. The voice-coil motor according to claim 1, wherein more than 75% of all of the circuit traces include a radial section.

5. The voice-coil motor according to claim 1, wherein circuit traces within a coil unit include a section extending along a partially circular line having a center located on the swivel axis.

6. The voice-coil motor according to claim 1, wherein at least one circuit-board conductor is arranged to form a plurality of coil units in one plane.

7. The voice-coil motor according to claim 6, wherein the coil units are arranged substantially symmetrically with respect to a point arranged in the plane of the coil units on the swivel axis.

8. The voice-coil motor according to claim 6, wherein the coil units include a spiral-shaped path, a partial number of the coil units oriented in a clockwise direction, and a partial number of the coil units oriented in a counterclockwise direction.

9. The voice-coil motor according to claim 1, wherein the printed circuit board includes a plurality of layers, each layer including at least one coil unit.

10. The voice-coil motor according to claim 9, wherein sections of the circuit traces of the coil units are arranged on different layers of the printed circuit board in a superposed manner.

11. The voice-coil motor according to claim 10, wherein the radial sections of the circuit traces are arranged on different layers of the printed circuit board in a superposed manner.

12. A positioning device, comprising:
a swivel shaft, one end of the swivel shaft attachable to an element to be positioned;
a position measuring device including two parts movable relative to each other; and
a voice coil motor including a stator and a rotor, the rotor pivotable about a swivel axis relative to the stator;
wherein at least one of (a) the rotor and (b) the stator includes a printed circuit board having at least one circuit-board conductor arranged to form at least one coil unit in a plane, the at least one coil unit including a plurality of circuit traces; and
wherein within one coil unit, more than two circuit traces include a radial section oriented in a radial direction directly toward the swivel axis, an extension of each radial section intersecting the swivel axis wherein each radial section in nonparallel to each adjacent radial section.

13. The positioning device according to claim 12, wherein the positioning device is arranged as a servo-track writer.

14. The positioning device according to claim 12, wherein the printed circuit board is attached to the rotor.

15. The positioning device according to claim 12, wherein the position measuring device is configured to perform photoelectric scanning.

16. The positioning device according to claim 12, wherein the position measuring device is configured to perform photoelectric scanning according to an interferential measuring principle.

17. The positioning device according to claim 16, wherein a first part of the position measuring device includes a transparent phase grating, and a second part of the position measuring device includes a reflection phase grating.

18. The positioning device according to claim 16, wherein a first part of the position measuring device includes a reflection phase grating, and a second part of the position measuring device includes a transparent phase grating.

19. A servo track writer, comprising:
a swivelable shaft, one end of the shaft attachable to an element to be positioned;
a position measuring device including two parts movable relative to each other; and
a voice-coil motor including a stator and a rotor, the rotor pivotable about a swivel axis relative to the stator;
wherein at least one of (a) the rotor and (b) the stator includes a printed-circuit board having at least one circuit-board conductor arranged to form at least one coil unit in a plane, the at least one coil unit including a plurality of circuit traces; and
wherein within one coil unit, more than two circuit traces include a radial section oriented in a radial direction directly toward the swivel axis, an extension of each radial section intersecting the swivel axis wherein each radial section in nonparallel to each adjacent radial section.

20. The servo track writer according to claim 19, wherein the printed circuit board is attached to the rotor.

21. The servo track writer according to claim 19, wherein the position measuring device is configured to perform photoelectric scanning.

22. The servo track writer according to claim 19, wherein the position measuring device is configured to perform photoelectric scanning according to an interferential measuring principle.

23. The servo track writer according to claim 22, wherein a first part of the position measuring device includes a transparent phase grating, and a second part of the position measuring device includes a reflection phase grating.

24. The servo track writer according to claim 22, wherein a first part of the position measuring device includes a reflection phase grating, and a second part of the position measuring device includes a transparent phase grating.

* * * * *